(12) United States Patent
Harvey et al.

(10) Patent No.: US 8,244,209 B2
(45) Date of Patent: Aug. 14, 2012

(54) AIRBORNE PICO CELL SECURITY SYSTEM

(75) Inventors: Richard Lee Harvey, Branchburg, NJ (US); John Frank Pawlik, Chicago, IL (US)

(73) Assignee: Cellco Partnership, Basking Ridge, NJ (US)

( * ) Notice: Subject to any disclaimer, the term of this patent is extended or adjusted under 35 U.S.C. 154(b) by 529 days.

(21) Appl. No.: 11/543,230

(22) Filed: Oct. 5, 2006

(65) Prior Publication Data

US 2008/0085691 A1    Apr. 10, 2008

(51) Int. Cl.
H04M 1/66 (2006.01)
H04W 4/00 (2009.01)
H04L 29/06 (2006.01)

(52) U.S. Cl. .................. 455/410; 455/431; 713/166
(58) Field of Classification Search .............. 455/410; 379/189; 726/1–36; 713/166
See application file for complete search history.

(56) References Cited

U.S. PATENT DOCUMENTS

| | | | |
|---|---|---|---|
| 5,519,761 | A | 5/1996 | Gilhousen |
| 5,548,809 | A | 8/1996 | Lemson |
| 5,594,782 | A | 1/1997 | Zicker et al. |
| 5,857,155 | A | 1/1999 | Hill et al. |
| 6,314,286 | B1 * | 11/2001 | Zicker ..................... 455/431 |
| 6,321,090 | B1 | 11/2001 | Soliman |
| 6,788,935 | B1 | 9/2004 | McKenna et al. |
| 6,928,064 | B2 | 8/2005 | Proctor, Jr. |
| 2001/0001616 | A1 | 5/2001 | Rakib et al. |
| 2003/0013489 | A1 | 1/2003 | Mar et al. |
| 2003/0144014 | A1 * | 7/2003 | Kumhyr .................. 455/465 |
| 2004/0110520 | A1 | 6/2004 | Barbara et al. |
| 2004/0142658 | A1 * | 7/2004 | McKenna et al. .......... 455/11.1 |
| 2005/0160297 | A1 * | 7/2005 | Ogawa ..................... 713/202 |
| 2005/0162396 | A1 * | 7/2005 | Meckesheimer et al. ..... 345/169 |
| 2006/0025131 | A1 * | 2/2006 | Adamany et al. .......... 455/432.1 |
| 2006/0206246 | A1 * | 9/2006 | Walker ..................... 701/16 |
| 2007/0133437 | A1 * | 6/2007 | Wengrovitz et al. .......... 370/260 |

OTHER PUBLICATIONS

International Search Report and Written Opinion of the International Searching Authority, issued in International Patent Application No. PCT/US 07/20717, dated Mar. 18, 2008.
E. Hasbrouck, "What's in a Passenger Name Record (PNR)", The Practical Nomad.
U.S. Appl. No. 09/655,541, filed Sep. 6, 2000, entitled Global Positioning System Based Booster Amplifier, and Rule 116 amendment thereof.
U.S. Appl. No. 11/416,324, filed May 3, 2006, entitled Frequency Overlay Technique for a Pico Cell System.

(Continued)

*Primary Examiner* — George Eng
*Assistant Examiner* — Jing Gao

(57) ABSTRACT

Security is provided in a wireless communication system in a moving vehicle, e.g. an aircraft, by requiring user input of one or more security codes for validation before the system permits communication. One code, a security access code (SAC), corresponds to the vehicle travel segment (e.g. flight) and is given to the passenger(s) in transit, e.g. after the aircraft reaches a particular altitude. The second type of possible code, a personal identification number (PIN), is given to the passenger after baggage check-in. The PIN code would be correlated to the passenger and/or seat assignment. The use of either or both codes helps prohibit connectivity for mobile phone handsets or other wireless devices stored in the cargo bay or in other baggage. PIN use enables associated data systems to report the seat number or location of all parties engaging in wireless communications within the vehicle.

30 Claims, 3 Drawing Sheets

OTHER PUBLICATIONS

U.S. Appl. No. 10/461,680, filed Jun. 16, 2003, entitled Method and Apparatus for Operating a Private Wireless Network Within a Public Wireless Network.

U.S. Appl. No. 10/461,680, filed Jun. 16, 2003, Kevin Morehead et al.

International Search Report and Written Opinion dated Jul. 27, 2007 issued in PCT/US06/46001.

International Preliminary Report on Patentability and Written Opinion dated Nov. 13, 2008 issued in PCT/US06/46001.

* cited by examiner

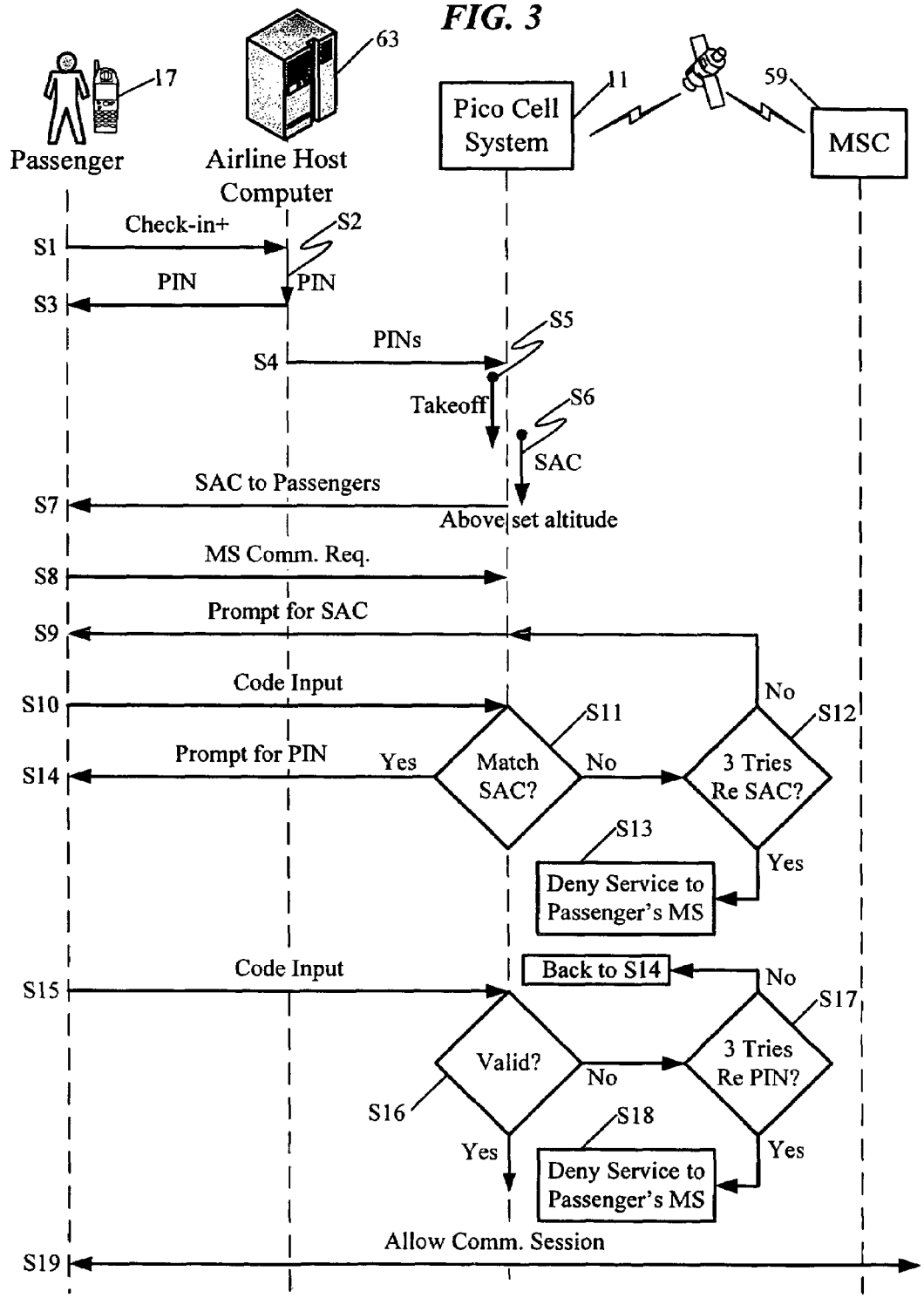

AIRBORNE PICO CELL SECURITY SYSTEM

TECHNICAL FIELD

The present subject matter relates to techniques and equipment to provide security in a pico cell type wireless communication system, e.g. in a moving vehicle such as an aircraft, based on a requirement for user input of one or both of two codes. The first code is a security access code (SAC), which corresponds to the vehicle travel segment and is given to the passenger(s) in transit, e.g. after the aircraft reaches a particular altitude. The second code is a personal identification number (PIN) given to the user typically after baggage check-in, which can be correlated to user information, such as the user's identification and seat assignment.

BACKGROUND

In recent years, mobile wireless communications have become increasingly popular. Initial implementations of mobile wireless communications, for example in the form of cellular telephone networks, supported circuit switched voice communication services. Today wireless carriers also offer packet data communication services to their mobile customers. A significant advantage of wireless communications is mobility, that is to say, the ability to communicate at virtually any location throughout a wide geographic area and/or while moving or roaming about that area. At the same time, the mobile communication devices, typically handsets or personal digital assistants (PDAs) or the like have become quite small, light and portable. As a result, subscribers to mobile wireless communication services routinely carry their mobile devices with them wherever they go and as they travel, including when they travel on commercial transport vehicles like buses, trains and airplanes.

Traditionally, the use of mobile communication devices on commercial transport vehicles has been limited or prohibited entirely. For example, on airplanes, in-flight use of such devices is prohibited, as the high power levels required to communicate with ground-based cell sites might interfere with aircraft navigational communications or other operations of the airplane.

Small-scale cellular wireless systems have been developed for indoor use, e.g. to provide wireless private branch exchange type services. US application publication no. 2003/0013489 to Mar et al., for example, discloses an IP-based technique for providing wireless communication services for an enterprise. Mobile devices communicate with pico cells when within the enterprise premises and with macro base stations of a public cellular network when outside the enterprise. In general, a small scale or indoor cellular communication system may be referred to as a "pico cell" system, with the outdoor cellular communication system being referred to as a "macro cell" system. Within such a small scale system, each pico cell consists of a low power base station. For example, the pico cell may include a scaled down cellular transceiver for GSM communication or a scaled down cellular transceiver for CDMA communication. Other versions of the pico cell systems may be implemented by other types of wireless technology, e.g. wireless access points serving as WiFi (IEEE 802.11) hot spots.

Recently, a number of parties involved in the wireless communication industry and/or the airline industry have proposed the use of such pico cells to provide connectivity for a customer's handset when the user is within an airplane. U.S. Pat. No. 6,314,286 to Zicker, for example, proposes a miniature cellular network for use in an airplane, including internal base stations and an air-to-ground communication link. The advantage of a pico cell type system in the vehicle is that customers can use their own mobile station equipment on the plane or other vehicle. The mobile handsets or the like would be operated at very low power, reducing interference they might otherwise cause at ground base-stations and/or with aviation systems of the airplane.

However, in-flight use of mobile communications services raises security concerns. For example, it has been suggested that a terrorist might place a cell phone in luggage that is checked-in and stowed in the cargo bay, and then the cell phone might be used to trigger a bomb in response to a call to the cell phone. The radio isolation between the cargo bay and passenger areas is minimal, perhaps only 3 db since the floor of planes is fiberglass. It is not practical to shield the floor. Hence, The DOJ/DHS/FBI have asked the FCC and the industry to provide certain security features with regard to on board mobile station service. Some of these security features would be to control mobile handset access when the handset has been left powered on and packed in luggage and stored in the cargo bay. Another desired security features would be to provide the seat location of a mobile station caller using a mobile device while on-board the aircraft.

A need therefore exists for one or more security systems or techniques to support pico cell services for mobile stations in a moving vehicle such as an aircraft, e.g. to prevent operation of a mobile station from the cargo bay via the pico cell system and/or to provide assigned seat information regarding a passenger making or receiving a call via the pico cell system.

SUMMARY

The teachings herein address one or more of the needs for security in a pico cell system for a vehicle, such as an airplane, by requiring user input of one or both of two codes. The first disclosed code is a security access code (SAC) that corresponds to the vehicle and its travel segment (e.g. flight) and is given to the passenger(s) in transit, e.g. after the aircraft reaches a particular altitude. If implemented, the second code is a personal identification number (PIN) code that is given to the passenger after baggage check-in. The PIN code can be correlated to the passenger's identification and/or seat assignment. The present teachings also encompass use of the PIN code functionality without use of the SAC.

Aspects of the disclosed teachings may be embodied in methods of operating pico cell systems, pico cell systems or software for controlling operation of such systems. Although the pico cell discussion herein concentrates on mobile cellular type communications, those skilled in the art will appreciate that the pico cell system may implement other wireless communications, such as a hot spot for wireless local area network communications, e.g. using IEEE 802.11 type WiFi wireless access points.

Hence, a disclosed method of operating a pico cell system in a vehicle provides security for wireless communications for a mobile station of a user riding in the vehicle. The method involves assigning a security access code to the vehicle for a travel segment of the vehicle. After travel of the vehicle over the segment commences, the security access code is provided to people riding in the vehicle, including the user of the mobile station. The pico cell system receives an input code from the mobile station in the pico cell system, during the travel of the vehicle over the segment. Based on a comparison of the received input code to the security access code, the mobile station is denied wireless communication service through the pico cell system in the vehicle, if the received input code does not match the security access code.

A similar method using a PIN code may be implemented in combination with the SAC technique outlined above. Service is denied if the user has not yet entered a code that satisfies PIN code criteria. The criteria may be an expected PIN code format. Another approach might require the input code to match a stored code that has been assigned to a specific passenger on the flight.

A specific example for operations of the pico cell system in an aircraft implements both types of codes. In that example, the method involves assigning a security access code to a scheduled flight of the aircraft and assigning a personal identification number (PIN) code for a user of a mobile station for travel on the scheduled flight. The PIN code is correlated to an identification of the passenger and to a seat assignment within the aircraft for the user of the mobile station. The PIN code is issued to the user of the mobile station at or after the user checks-in as a passenger for the scheduled flight. Then, after the scheduled flight of the aircraft commences, the security access code is provided to people in the aircraft, including the user of the mobile station. The exemplary aircraft method also entails receiving first and second input codes from the mobile station in the pico cell system during the scheduled flight of the aircraft and comparing the received codes to the security access code and the PIN code. The mobile station is denied wireless communication service through the pico cell system in the aircraft, either when the first input code does not match the security access code or when the second input code is not valid as a PIN code. Conversely, the methodology enables the mobile station to utilize wireless communication service through the pico cell system in the aircraft, when the first input code matches the security access code and the second input code is validated as a PIN code.

In the aircraft example, the security access code is provided to the user of the mobile station only after the aircraft reaches a predetermined altitude during the scheduled flight. After the flight, the security access code is invalidated. Subsequently, a different security access code is assigned for another scheduled flight of the aircraft. By noting the PIN code when the mobile station communicates through the pico cell system, it is possible to correlate the passenger and seat assignment to each mobile station communication.

In the simplest form, the PIN code validation may entail a certification that the second code is properly formatted as a PIN code. Alternatively, the second code may be checked against a list of valid PIN codes assigned to passengers on the flight segment and correlated to their seat assignments. Validation might even require that the code received via an identified mobile station match the PIN code assigned to the passenger that had that mobile station at check-in. The controller of the pico cell system may simply record the PIN code for each mobile station call, for future data transfer, e.g. if needed to process data regarding calls to or from one or more passengers.

The detailed description also discloses an example of a pico cell system for use in a vehicle to provide wireless communications for mobile stations of users riding in the vehicle. Such a system includes a base station for wireless communication with the mobile stations within the vehicle, a base station controller for controlling wireless operations of the base station and a communication interface coupled to the base station for providing two-way communications to and from a public communication network. To implement the security techniques, the pico cell system also includes a security server or software for a control element of the system for controlling mobile station access to communications through the interface to and from the public communication network. The security server is configured to receive input codes from the mobile stations within the vehicle via the base station during a scheduled travel segment of the vehicle and to deny each one of the mobile stations access to communications through the interface to and from the public communication network if the mobile station has not provided an input code that matches a security access code. The security access code corresponds to the scheduled travel segment of the vehicle, is valid only for the scheduled travel segment, and is given to users of mobile stations within the vehicle only after the vehicle begins travel of the scheduled segment. Optionally, the security server may support the PIN code functionality, too.

As noted, program products also are disclosed. Such a product comprises a machine readable medium and executable code embodied on the medium. Execution of the code by a programmable security server or other controller of a pico cell system operating in an aircraft will cause the security controller to control operations of the pico cell system to provide wireless communications for mobile stations within the aircraft. In one such product, controlled operations include issuing to mobile station users in the aircraft a security access code assigned to the aircraft for a scheduled flight. However, the code is provided to the passengers only after the aircraft begins the scheduled flight. The operations also include denying each one of the mobile stations access to communications between the pico cell system and from a public communication network if the one mobile station has not provided an input code that matches the security access code.

Another program product supports the PIN code operations like those discussed above. For example, the programming may cause the security server or controller to deny service to any of the mobile stations that attempts access to communications between the pico cell system and from a public communication network, if the mobile station has not also provided an input code that satisfies criteria for a valid personal identification (PIN) code. In such an implementation, the program controlled operations would allow a mobile station to access communications between the pico cell system and the public communication network, if the mobile station has provided an input code that satisfies the PIN code validation criteria. An association of the validated received code is recorded with respect to each communication for the mobile station provided through the pico cell system.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 is a signal flow diagram useful in explaining security operations using a security access code (SAC) as well as the optional PIN code.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

In accord with the discussion below, security is provided in a pico cell type wireless communication system in a moving vehicle, e.g. an aircraft. The security functionality requires user input of one or both of two codes. The first type of code, a security access code (SAC), corresponds to the vehicle travel segment (e.g. flight) and is given to the passenger(s) in transit, e.g. after the aircraft reaches a particular altitude. A second type of code may be utilized, as well. If implemented, the second code is a personal identification number (PIN), which may be given to the passenger after baggage check-in. The PIN code can be correlated to the passenger and/or the passenger's seat assignment. The use of either or both codes helps prohibit connectivity for mobile phone handsets or other wireless devices stored in the cargo bay or in other baggage inside the vehicle. The use of the PIN code enables associated data systems to report the assigned seat numbers of all parties making or receiving calls or other wireless communications within the vehicle, if or when desired.

As used herein the term "pico cell" refers to indoor wireless operations of relatively small scale or power, e.g. as compared to a pubic wide area network such as the public cellular communication network. Examples discussed below utilize small scale cellular communication transceiver and related equipment, although the present teachings regarding "pico cell" security are applicable to other small scale or privately operated in-vehicle systems that may utilize other wireless technologies, e.g. 802.11 type wireless access points to implement the pico cells in a manner analogous to common wireless data communication hot spots.

Figure 1:
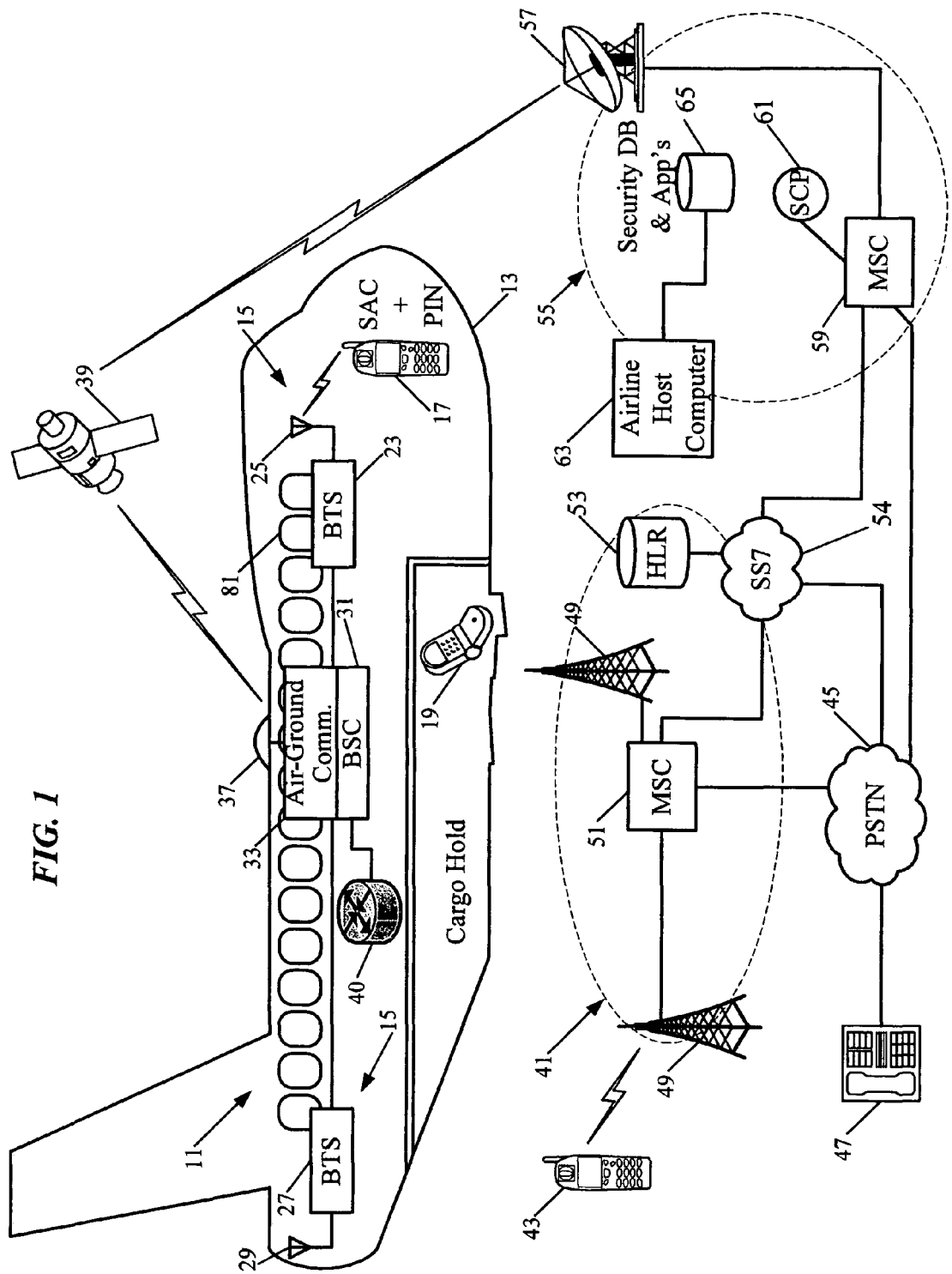
FIG. 1 is a functional block diagram illustrating an example of a pico cell wireless communication system for airplane service, with associated security access code and PIN code based security.

Reference now is made in detail to the examples illustrated in the accompanying drawings and discussed below. Although applicable to installations in ground or water borne transport vehicles, FIG. 1 depicts functional elements of a simple example of an airborne pico cell system 11. The drawing also depicts functional elements of a network 55 supporting communications to/from the airborne pico cell system 11. For discussion purposes, FIG. 1 also provides a simplified illustration of a public mobile communication network 41, e.g. as an example of a network through which the mobile stations might communicate when the users are not traveling via the aircraft 13 that contains the pico cell system 11.

The pico cell system 11 provided within the aircraft 13 includes one or more wireless base stations 15 serving respective 'cells' within the aircraft. Each pico cell base station 15 consists of a low power base station transceiver (BTS), that is to say BTS 27 or BTS 29, in the two base station example shown in the drawing. Each BTS, for example, may include one or more scaled down cellular transceivers and/or a WiFi type wireless access point transceiver.

Although such a system 11 could be utilized in other types of vehicle, such as a bus or a train or any of a variety of different aircraft types, in the illustrated example, the pico cell system 11 provides wireless communication service inside an airplane 13. In such an application, the indoor service area covered by the pico cell system 11 encompasses at least the passenger compartment and may include the crew cabin/bridge and other areas within the vehicle 13. The pico cell system 11 provides wireless communications within the indoor service area, for one or more mobile stations. The mobile station 17 is shown in the passenger compartment and may used by passengers or crew members. The mobile station 19 represents a station stowed in the baggage compartment, e.g. inside a passenger's luggage.

A base transceiver system (BTS) 23 and associated antenna 25 form a first base station, and a BTS 27 and associated antenna 29 form a second base stations. The base stations may provide coverage over different areas within a large airplane, or the base stations may offer somewhat different services (e.g. GSM and CDMA or WiFi and cellular telephone). Together, the base stations 15 provide wireless service for compatible mobile stations 17 operating in the indoor service area inside the airplane 13. A BTS is the part of a radio network that sends and receives signals via the associated antenna over the air to/from the compatible mobile stations that the base station currently serves, in accord with an applicable wireless communication protocol or standard. The principles under discussion here are applicable to a number of different types of wireless communications network technologies. For example, the system might operate in accord with the IS-95 standard, a 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. Those skilled in the art will recognize that the base station elements may simultaneously support service in accordance with a plurality of the public wireless standards.

The antennas 25 and 29 may be any available type convenient for providing wireless communications over the desired interior space of the airplane 13. Both antennas may be similar, as in the illustrated example, or the base stations may use different types of antennas. For example, one antenna might be a leaky coaxial cable type antenna, whereas the other antenna might be an omni-directional antenna or a panel type antenna.

The pico cell system 11 also includes a controller for controlling wireless operations of the one or more base station. In the exemplary system 11 for an aircraft 13, the controller takes the form of a base station controller (BSC) 31. The BSC 31 controls the functions of a number of base stations 15, and in a pico cell system 11, the BSC 31 helps to manage communications through the system, e.g. to set-up calls or sessions with the public network.

The pico cell system 11 also includes an air-to-ground communication interface 33 coupled to the one or more base stations 15, for providing two-way communications to and from a public communication network. Examples of the public network include the public switched telephone network (PSTN) 45 and the public Internet (not shown). The link to the controller, in the form of a public network(s) on the ground could use cellular, PCS or special air-to-ground frequencies. In the example, this link is a satellite link, hence, the air-to-ground communication interface 33 connects to an antenna 37 for two-way mobile communication with a satellite 39.

The pico cell system 11 could implement standard voice/cellular type communications. Alternatively, the system and interface may provide a voice over Internet Protocol (VoIP) communication at least from the air to the ground.

For security purposes, the pico cell system 11 includes an on-board security controller, in the form of a server 40 in the example. The security controller/server 40 may be a program running on any appropriate device of the on-board pico cell system, such as the BSC 31 or the communication interface 33. Alternatively, the security server program may run on a separate computer platform coupled to the BSC 31 and/or the interface 33.

Operation of a mobile station within the airplane 13 requires user entry of one or more codes, which are checked for authenticity by the security server 40 before the mobile station is allowed to communicate via the pico cell system 11. Two such codes are discussed in detail in the examples. The first code is a security access code (SAC), which corresponds to the aircraft travel segment (e.g. flight no. and/or current destination). The SAC is given to the passenger(s) after take-off, typically after the aircraft reaches a particular altitude. The second exemplary code is a personal identification number (PIN), which is given to the passenger at or after baggage check-in. The PIN can be correlated to the passenger and/or seat assignment for communication tracking purposes.

The passenger inputs the code(s) on the mobile station 17, and if security server 40 of the pico cell system 11 authenticates the user input code(s), the pico cell system 11 provides wireless communication service to/from the mobile station 17. However, the server denies service to any station 19 that has not provided the valid code(s). Since the codes are not given to the passenger at a time when the mobile station 19 is still in the passenger's possession, the codes can not be entered into the mobile station 19 in the cargo hold or other baggage, even if the mobile station 19 is left ON.

Hence, the use of either or both codes helps prohibit connectivity for mobile phone handsets or other wireless devices stored in the cargo bay or in other baggage in the aircraft 13. The use of the PIN code enables associated data systems to report user information (e.g. identification and/or seat assignment) about any passenger making or receiving calls or other wireless communications via an authenticated mobile station 17 within the airplane 13, as will be discussed in more detail below.

As noted, the SAC code is typically provided to the passenger(s) during the aircraft flight. The SAC code may be generated directly by the security software in the pico cell system 11, e.g. running on the server 40. Alternately, it could have been created by a terrestrial security server and then transmitted to the pico cell system 40. In either case, the code typically is a random number assigned to the flight segment.

The SAC Code could be either displayed to the cabin crew, who would then announce the code to the passengers, or it could be displayed directly to passengers by the pico cell system. For example, SAC displays could be provided around the aircraft passenger compartment and connected to the server 40, so as to provide visible displays to all of the on-board passengers. Another approach might be to couple the server 40 to the on-board video system so as to display the code to the passengers via appropriate on screen displays.

In the exemplary implementation, the SAC code is unique to the flight segment and distributed only after take-off. This ensures that only on-board passengers know the correct SAC. The SAC code is sufficiently long (perhaps 4 to 6 characters) to make it difficult for an unattended device 19 to determine via brute force. In operation, the passenger would register their mobile station handset 17 or data device with the pico cell system 13 by entering the SAC (along with their PIN, if implemented). The passenger is required to re-register for each flight segment with the new SAC if they wish to make calls during subsequent flight segments. The security software in the server 40 of the pico cell system 11 allows communications only when the correct flight segment SAC code is entered.

If system 11 implements the additional PIN functionality, the customer would also be required to enter a valid Personal Identification Number (PIN) along with the SAC. This PIN code is assigned to the passenger when they check in for the flight. Although the physical location of the wireless device within the airplane 13 is unknown, the PIN functionality provides a means whereby the PIN and ultimately any calls made to or from the plane can be logically connected to the passenger ticket and also the assigned seat number.

On-board validation of PIN codes by the pico cell security server 40 may only validate the format of the input code. Alternatively, input codes may be compared to a list of PIN codes assigned to specific passengers on the flight segment. When calls or data communications are made or received, usage records compiled by the pico cell system include the PIN information, for analysis of individual passenger communications if or when desired. Since the PIN is correlated to the passenger and/or the passenger's seat assignment, the analysis can include analysis of passenger information or assigned seating, as may be useful to a particular security screening technique.

The PIN can be implemented several ways. The most basic implementation would be to provide each passenger with a unique code that encodes the passenger's identification and assigned seat number. The code would be encrypted such that passengers cannot guess a valid alternate code and the pico cell's security software will recognize the code as a valid format code. The pico cell system would check and validate format of a code entered as a PIN before allowing communication. The pico cell system 11 would store the PIN locally in association with its records of call(s) to/from the passenger's mobile station. However, the system would only communicate the data via the air to ground radio link to security operations upon request. The Passenger Name Record ("PNR") could be the basis for assigning the PIN, as well.

Another approach would be for a security server on the ground to assign each passenger a unique PIN code upon check-in. Then prior to the plane leaving the gate, codes for all passengers are transferred to the pico cell electronically or by physical installation of a memory card. This could be done by a secure wireless link, if available. The server 40 would check the entered codes against the list of passengers' valid PIN codes.

A third alternative is to have the terrestrial security server check the PIN code in-flight. In this case the pico cell is in full time communications via the air to ground radio link with the terrestrial security server. If the mobile station has passed SAC validation, the pico cell server 40 would then transmit the user entered PIN code input to the security server on the ground for validation, and the ground server would reply either authorizing the user or not. In this case, the terrestrial security server would store the PIN assigned to the user, for use of security operations.

Just as passengers need to protect their carry on baggage from being tampered with, they would be informed to protect this personal security code.

No data messages to the ground neither incoming nor outgoing nor any calls, even incoming ones are allowed until the subscriber has entered a valid SAC and PIN (if implemented) and has been registered. Registration is required once per flight segment. Optionally, the passenger could be required to enter their PIN for each call placed or call received or to begin a data session.

Since handsets 19 and/or wireless data devices stored in the cargo bay would not have either valid SAC's or PIN's, they would not be able to register on the pico cell system 11 and would be denied service. Users could be given three (or some other small number of) attempts to register, after which the security system would lock out even valid entries. There may be tactics that a hacker might use to try to avoid such a lock out of a particular mobile station by the pico cell system and continue attacks to determine a valid code, such as modifying any identification code(s) sent by the mobile station device when it attempts to register with the pico cell system after a lock out by the pico cell system. To reduce risks of such attacks, the security server may shut down the pico cell system entirely, if it detects a number of mobile station lock outs (due to failure to enter the SAC within the set number of attempts and/or failure to enter the PIN within the set number of attempts) within a predetermined period of time. The time limit for mobile station failures/lock outs may be a few minutes or may correspond to the length of the flight, etc. Typically, the pico cell system would remain disabled until manually reset, e.g. after landing at the end of the flight.

The SAC system proposed can only prevent devices from accessing the on board pico cell system. If there are sufficiently strong radio signals from terrestrial wireless networks present in the cargo bay or stored luggage, then devices such as mobile station 19 located there could access the terrestrial networks directly.

A number of aspects of the pico cell operations and the attendant security are supported by ground networks or involve some degree of interaction with the customer's home network (typically a terrestrial cellular communication network). To fully appreciate such aspects of the system operations, it may be helpful to consider examples of the ground network and home terrestrial cellular communication network, before considering more detailed operation examples with regard to FIGS. 2 and 3.

The aircraft communication service could be operated by the airline or an independent party having no particular affiliation with ground networks that normally service the mobile stations. In such a case, the provider might operate a credit/prepaid platform and a switch or router or gateway for interfacing the customer communications to other networks. However, another approach might involve implementing the aircraft service by or in cooperation with a terrestrial wireless service for the mobile stations, as shown in the example of FIG. 1.

Hence, as shown in FIG. 1, one or more carriers operate wireless terrestrial networks to provide mobile communications services to mobile stations 43, including to the stations 17 and 19 when their users of those stations are on the ground. Although there are often a number of such public mobile network and portions thereof are distributed throughout the country and throughout much of the world, a small portion of one such network is shown in the drawing for purposes of this discussion.

In the example, a carrier operates a wireless network 41, such as a CDMA type network. The present concepts are applicable to a variety of different public wireless technologies supporting voice and/or packet data communications services. The public wireless communication network 41 provides mobile voice telephone communications, and typically offers packet data services as well, for numerous compatible mobile stations, although for ease of illustration and discussion, only one mobile station 43 appears in the drawing. In an EVDO implementation, the all packet network would support telephone type services using Voice over IP (VoIP) type communications, although associated server components are omitted for convenience. In a 1xRTT implementation, the CDMA system would carry voice communications as separate circuit switched communications.

The network 41 enables users of the mobile stations 43 to initiate and receive telephone calls to each other as well as through the public switched telephone network (PSTN) 45, for example for communications with landline telephone devices 47 or mobile stations within the airplane 13. Although certain network elements are omitted for convenience, the network 41 also enables users of the mobile stations 43 to initiate and receive various data communications, for example, through the public Internet and/or private Intranets (not shown).

The wireless network 41 includes elements forming a macro area radio access network (RAN). These elements typically include a number of base stations represented in the example by the respective base station (BS) antenna towers 49. Each base station typically includes a base transceiver system (BTS), which communicates via an antenna system at the site of base station 49 and the air-link with one or more of the mobile stations 43, when the mobile stations are within range. The BTS is the part of the radio network that sends and receives radio frequency (RF) signals to/from the mobile stations that the base station currently serves. For convenience, the BTSs are omitted from the illustration of the network 41, as they are conventional in nature.

The network 41 also includes a traffic network, which carries the user communications for the mobile stations 43. In the example, the traffic network includes a mobile switching center (MSC) 51, which provides circuit switched connections, e.g. to the PSTN 45 and possibly to a packet data serving node (not shown) for data communication sessions. In a 1xRTT implementation, the MSC 51 may be a modern version of a circuit switched mobile telephone switch, which supports both cellular voice and packet data services. Each such switch connects through trunk circuits (not shown) to a number of the BTS base station transceivers at base stations 49, which the respective switch serves and controls. In an EVDO (Evolution Data Optimized) implementation, the traffic network is a high-speed packet switched data network, and the MSC 51 comprises a packet switch/router connected to the BTSs at base stations 49.

The network 41 typically includes a base station controller (BSC) functionality that controls the functions of a number of base stations and helps to manage how calls made by each mobile station 43 are transferred (or "handed-off") from one serving base station 49 to another. Each wireless network equipment vendor implements this function differently. Some vendors have a physical entity, which they call a BSC, while other vendors include this functionality as part of their MSC 51.

For wireless services, the mobile stations are provisioned to normally operate in the serving area of one wireless system operated by the user's access service provider that is to say one of the carriers. In the example, mobile stations such as 17, 19 and 43 are homed to the public network 41.

For voice communication services, a public mobile wireless network such as the network 41, typically includes a Home Location Register (HLR) 53, which stores data regarding the valid station's identification, the assigned telephone number, subscription service options terminal capabilities, etc. for each mobile station homed to the network 41. The home network 41 uses the service information from the HLR 53 to provide the subscribed services to each user's mobile station, for example, while the station is operating in the service area of the home network 41 as is the station 43 in the illustrated example. Although the HLR 53 may reside in an MSC 51 or other switch, today, the HLR 53 typically runs as an application/database on a separate computer coupled for packet signaling communication via a signaling system sever (SS7) type signaling network 54, which also provides signaling communications to/from other networks. In some networks, the computer or server providing the HLR functionality is referred to as a Service Control Point (SCP). Of course, there may be multiple computers distributed throughout the network 41 for performing the HLR function. In some implementations, the SCP functionality is incorporated into an MSC or into a switch or router of the packet network providing the SS7 signaling communications. Other implementations provide packet communications to and from the element serving as the HLR via IP networking.

As each customer roams, their mobile station registers in service areas other than the home area. To facilitate roaming and attendant registration for voice services, each network also implements a Visitor Location Register (VLR). A VLR is a location register, which an MSC temporarily uses to store and retrieve information regarding a visiting user's mobile station. VLRs typically reside in the MSCs although the function may be implemented in other network nodes. The VLR and the HLR interact to validate each roaming mobile station. For a validated station, service information for that station is downloaded from the HLR to the VLR in a visited access network during a successful registration process. The validation process also provides information to the HLR indicating the current location of the station, to allow the home network 41 to route incoming voice calls to the station at its current location.

A service provider, offering the pico cell-based mobile service within the airplane 13 will operate a terrestrial network 55 to provide control and connections to other networks and to support the security features under consideration here. Such a terrestrial network will typically service pico cell systems 11 operating in any number of airplanes 13. To some extent the terrestrial part 55 of the air service network acts like another terrestrial mobile network, e.g. in terms of its interactions with the home network 41 for mobile station validation and its ability to provide connections to public networks such as the PSTN 45 and the Internet.

The network 55 includes one or more ground stations 57 for communications with the airborne system. The downlink may use any of a number of known technologies. In the example using satellite 39, the ground station 57 is a downlink transceiver system for communications via the satellite 39 with the pico cell system 11 in the airplane 13. These communications include telephone call or data session traffic, and these communications include control signaling. Packet data communications may also be supported if offered by the pico cell system 11. As discussed in more detail later, at least some of the signaling communications includes PIN related security signaling. Telephone call or data session routing is provided by one or more switches, for example, by an MSC 59 that may be similar to the MSC(s) 51 used in the public mobile network 41.

The terrestrial network 55 also includes an SCP 61 that supports roaming of mobile stations into pico cell systems, and the SCP 61 may operate as a security system for the airborne communication service in some implementations. The SCP system may be similar to that discussed above as an implementation of the HLR functionality 53 of the public mobile communication network 41 and will communicate with the HLR 53, via the SS7 network 54 or another appropriate secure network facility. The SCP security system 61, for example, may provide a VLR type functionality to communicate with the HLR 53 to validate a mobile station 17 that attempts to register through the pico cell system 11 on the airplane 13, much like a VLR in a visited public mobile network. For a validated station 17, service information for that station may be downloaded from the HLR 53 to the SCP 61 in network 55 as part of a successful registration process. The validation process also provides information to the HLR 53 indicating the current operating location of the station 17, in this case, indicating accessibility of that station through the network 55 and the pico cellular system 11, so as to allow the home network 41 to route incoming voice calls through network 55 and system 11 to the station 17 at its current location inside the airplane 13.

From the perspective of the public carrier's network 41, the network 55 appears as another carrier's mobile network. In general, the mobile station 17 and its user perceive the pico cellular system 11 and its terrestrial support network as another mobile network that the station user has visited while roaming.

Normally, when a mobile station roams into a service area, the MSC assigns a register in its associated VLR data base to service that station, and the MSC and VLR validate the mobile station by communicating with the HLR. Registration of the roaming mobile station may be initiated by an attempt to obtain service, e.g. make an outgoing call, but often the registration is automatically initiated before the user sends or receives a call. In the pico cell system 11 and associated terrestrial network 55, however, the assigned VLR will not initiate a communication with the HLR 53 unless and until there has been a successful SAC and/or PIN number validation with the user of the mobile station 17. Until code validation, the pico cell system does not permit any signaling or bearer communication between the mobile station 17 and the ground.

The pico cell system 11 thus enables users of the mobile stations 15, 17 within the airplane 13 to initiate and receive telephone calls with each other, with mobile stations such as 43 that are operating through the terrestrial public wireless networks and/or through the public switched telephone network (PSTN) 45, for example for communications with landline telephone devices 47. Preferably, the pico cell system 11 also offers packet switched data communication services. In such an implementation, the system 11 enables users of the mobile stations 17 to initiate and receive packet data sessions for communication with various packet switched data communications equipment, for example to or via the Internet. These packet data services may allow communications with other networks such as private intranets.

In the example of FIG. 1, each of the mobile stations in the airplane and in the terrestrial network 41, for example, may take the form of a mobile telephone station, which may be enhanced with display and user input capabilities to support text and image communications, such as e-mail, picture communication and web browsing applications. Today, such mobile telephones typically take the form of portable handsets, as shown in the drawing, although they may be implemented in other form factors, such as personal digital assistants (PDAs) or handheld or laptop personal computers (PCs) incorporating or connecting to a wireless transceiver compatible with at least one type of wireless communication service offered by the pico cell system 10 and one of the terrestrial wireless networks. Of course, the mobile stations may take other forms or connect to a variety of other voice or data devices that may enable use of the network communication services.

The illustrated systems also include one or computer systems 63 operated by the airline, represented by the host computer 63 in FIG. 1; and the systems may include a security database and processing application 65. If the airline operates the ground network 55, the airline computer systems 63 may be an integral part or in close communication with the network elements. However, the ground network may also operate independently, e.g. if the airborne communication service is offered by a separate service provider. The security data base and application 65 could reside in the airline computer system 63 or be part of the ground network 55 with the MSC and SCP (as generally indicated in the drawing). As another approach, the security data base and application 65 may also run on or be associated with a computer system of a law enforcement or security agency. In any case, the security data base and application 65 accepts passenger information such as the "passenger name record" and then associates a PIN with that passenger. All passengers of the flight could be assigned a PIN, or PINs could be assigned just to those passengers that indicate that they will be using the airborne pico cell system. The passenger is given their PIN upon check-in.

Figure 2:
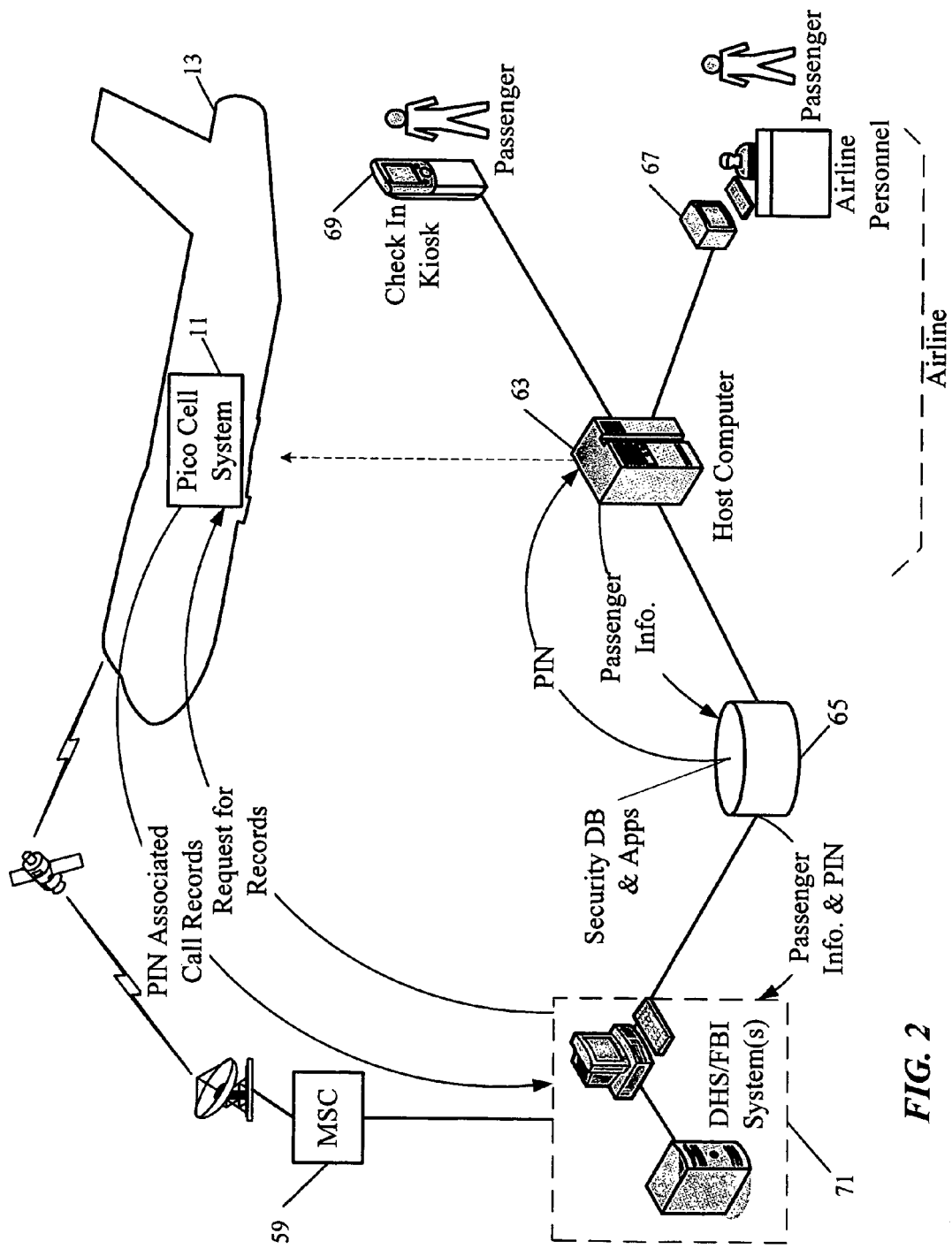
FIG. 2 is a functional block diagram useful in explaining the check-in phase of operations.

FIG. 2 is an additional block diagram, showing the systems involved in PIN code processing. In the example, the passenger checks-in with the airline. In this more detailed illustration, the airline's computer equipment includes the host computer 63, as well as one or more terminals 67 for airline personnel and one or more self check-in kiosks 69. Hence, passenger check-in may involve an interaction with airline personnel, who operate a terminal device 67 connected to the airline's host computer 63. Alternatively, the passenger may use an automated check-in kiosk 69, which also connects to the airline's host computer 65. In either case, the passenger identifies himself or herself in the normal manner and obtains a ticket, in the normal manner. Baggage may be checked-in with the airline at this time.

As part of the check-in activity, after baggage is checked-in or a determination is made that there will be no baggage check-in (carry-on only), the airline will offer the passenger and opportunity to obtain in-flight mobile phone service (or other mobile communication service) provided via the pico cell system 11. This may involve an offer by airline personnel who provide interactivity via the terminal 67 or an on-screen prompt via the kiosk 69. As a result of such activity, the passenger is given their PIN.

Although other PIN generation scheme's may be used, in the illustrated example of FIG. 2, the passenger information is sent from the airline's host computer system 63 to the database and security application 65, wherever that application may be running. The passenger data, for example, may include some or all of the information typically found in the passenger's name record (PNR) for the flight, e.g. including name, flight and seat assignment. The security application 65 uses or responds to the passenger information by generating a PIN for the passenger and recording the PIN and passenger information in its database. The database and security application 65 returns the PIN to the host computer 63, which relays it to the appropriate terminal 67 or kiosk 69. The terminal 67 provides a mechanism enabling airline personnel at the check-in counter to provide the PIN to the passenger for use on the flight. If the passenger is using the automated check-in, the kiosk 69 provides the PIN to the passenger for use on the flight.

In the database and security application 65 and possibly in the airline's computer system 63, the passenger information (including the passenger's ticket/travel information, such as the passenger's assigned seat number) is correlated to the assigned PIN. One approach, for example, would be to add the PIN information to the Passenger Name Record ("PNR") for the passenger's ticket travel, in the security database as part of or compiled by one or more security applications 65 and possibly within the PNR in the host computer 63 as well. As noted earlier, the security applications and database 65 may run on the airline host computer 63, on a separate hardware platform supplied by the operator of the pico cell system 11, or on any other convenient platform.

The security application 65 may also offer other related features. For example, the security application 65 may facilitate communication of PIN related information to the security server 40 (FIG. 1) in the pico cell system 11 on board the airplane 13 (FIG. 2). The security application 65 may also offer a communication link to (or reside in) systems of security personnel or appropriate authorities, represented in the example by the computer systems 71 for the Department of Homeland Security and/or the Federal Bureau of Investigation (DHS/FBI).

As discussed above, the pico cell system 11 in the airplane 13 will check an input code to determine if it is valid as a PIN code before allowing mobile station communications. However, such a validity check may be simply a check of the input code for a valid PIN format. If the pico cell server will compare the input code to a list of codes that are valid for passengers on the flight, the PIN codes for the flight will be transferred from the security application database 65 or the airline's computer system 63 to the server 40 in the pico cell system 11 on board the appropriate aircraft 13. In its simplest form, the correct set of PIN codes could be loaded manually, for example, using a memory stick or other flash memory device programmed with the codes after all passengers are checked-in. The memory device would be carried onto the plane for coupling to the pico cell system, where the codes are transferred from the memory to the server 40 of the pico cell system 11.

The PIN data transfer to the pico cell system could involve an electronic communication from the security application 65 to the server 40 in the pico cell system 11. For example, this could be done by a secure wireless link, if available, e.g. via the MSC etc. to the plane 13, much like normal communications to/from the airborne pico cell system 11. The communications for loading the PIN into the pico cell system 11 could be performed shortly before or just after take-off. Of course other forms of data transfer may be used.

As noted, the security application and associated database 65 could also offer communications to/from data processing systems 71 of the appropriate security authorities, e.g. the DHS or the FBI. Either automatically or upon request, the PIN and passenger information compiled in the database 65, for one or more passengers on the flight segment, would be sent to the systems 71 of the appropriate authorities.

Although automatic real-time data transfer could be provided, it is currently envisioned that the pico cell system 11 would simply record the PINs in association with call detail records or other usage records for the communications to/from the mobile stations 17 on the airplane 13. In the event that there was a need for detailed analysis of the record data, the pico cell system 11 would transfer the data to the DHS/FBI computer systems 71 or the like. Hence, in the example of FIG. 2, the DHS/FBI computer systems 71 send a request to the pico cell system 11, and the pico cell system 11 sends back the usage records for communications on the flight of the aircraft 13, for appropriate processing by DHS or the FBI.

Another approach would be for the pico cell system 11 to transmit the passenger PIN when it connects through the MSC 59. The MSC 59 would collect the PIN, call records and other information about the passengers' use of the on-board system 11. The DHS/FBI systems 71 would be provided the associated PIN for all call records and active communication sessions. The DHS/FBI could then request the passenger information associated with the PIN from the security data base 65. DHS/FBI would also have the capability of monitoring active communications associated with that PIN. The result is that DHS/FBI can identify which passenger enabled use of the communications device, which calls or data connections were made by that device, which calls or data connections are active for that device, and can monitor or disrupt active calls or data sessions.

To appreciate the overall operations of a specific example of the security procedures outlined above, it may be helpful to consider the exemplary process flow shown in FIG. 3.

At step S1, the passenger will check-in, and check-in data is entered in the airline computer system 63, as outlined above in the discussion of FIG. 2. At S2, the computer system 63 (e.g. via the associated security application 65) obtains or generates a unique PIN code for the individual passenger, effectively assigning the personal identification number code for the passenger that will use the mobile station 17 during her or his travel on the scheduled flight. The PIN code is recorded in association with various data regarding the passenger's travel (e.g. passenger identification, flight and assigned seat) and any other available information regarding the passenger or the passenger's mobile station 17, e.g. in the PNR or other record of the passenger's travel on the flight. In this way the PIN code is correlated to an identification of the passenger and to the passenger's seat assignment within the aircraft 13 for the user of the particular mobile station. At a point in the passenger's check-in activity, the airline computer system 63 issues the assigned PIN code to the passenger, e.g. via the kiosk 69 or via airline personnel using the terminal 67 at the check-in counter (step S3). In this example, once all passengers for the flight have checked-in, PINs for the particular flight are uploaded from the airline computer system 63 (or security application 65) to the security server 40 in the pico cell system 11 (step S4).

Thereafter, the airplane takes off (step S5). At a time after takeoff, the pico cell system 11 will generate the SAC for the particular flight segment (step S6). In this manner, the pico cell system effectively assigns a security access code for the scheduled flight of the aircraft. The pico cell system 11 provides the security access code to one or more people in the aircraft 13, including the user of the mobile station 17, for example via a display screen or the video displays within the aircraft. Typically, the pico cell system 17 would be configured to provide the SAC information to the passengers upon the aircraft reaching or passing a certain altitude after takeoff. This may be an automatic function responsive to an altimeter within the aircraft, or the airline personnel on the aircraft may activate the function at the appropriate time after takeoff, e.g. upon instruction from the pilot or the like that the aircraft has reached altitude.

Assume now that the passenger using mobile station 17 desires to communicate via the service offered by the pico cell system 11. The passenger will activate the mobile station 17 in an appropriate manner, and the pico cell system 11 will receive one or more messages from the mobile station 17 essentially representing a request for service (step S8).

In the example, the pico cell system 11 will transmit a signal to the mobile station to present a prompt to the passenger (step S9), to prompt the passenger to enter the SAC code. The prompt may be an audible message or a display message. In response to the prompt, the passenger will enter a first code on the mobile station, and the mobile station 17 will transmit the entered first code to the pico cell system 11 (step S10). Upon receipt of this first code, the server 40 in the pico cell system 11 will compare the first input code to the SAC code for the particular flight (step S11).

If the first input code does not match the currently assigned SAC code, processing branches from step S11 to step S12. In the example, the pico cell system 11 will allow some small number of attempts to enter a valid SAC code. The example permits three (3) tries before service denial, although a smaller or larger number of attempts may be permitted. Step S12 therefore involves a check of the number of times that the particular mobile station 17 has attempted SAC code entry. If not yet the third try, processing branches back to the step S9 to again prompt the passenger for SAC code input. The process continues through steps S9-S12 until input of the valid SAC code is detected at S11 or the three permitted attempts are exhausted at S12. When the current attempt is a third try by this mobile station 17 on this flight, then processing will branch from step S12 to step S13 in which the pico cell system 11 denies the mobile station wireless communication service through the pico cell system in the aircraft, i.e. because the first input code does not match the security access code. The denial of service will cause the pico cell system to ignore further communications for the particular mobile station 17 during the flight. At the time of denial of service, the pico cell system may send a message (not shown) to the mobile station 17 to inform the passenger.

Returning to step S11, assume now that the first input code from the passenger correctly matches the SAC code that the system 11 has generated for this flight segment. Hence, processing at S11 branches to step S14. If the system does not implement the PIN code functionality, this branch would essentially lead to further functions as necessary to implement actual communication for the mobile station 17 through the pico cell system 11.

In the illustrated example, the pico cell system also supports the PIN code functionality. Hence, at step S14, the pico cell system 11 will transmit a signal to the mobile station 17 to present another prompt to the passenger. This prompt instructs the passenger to enter a PIN code. The prompt may be an audible message or a display message. In response to the prompt at step S14, the passenger will enter a second code on the mobile station 17, and the mobile station will transmit the entered second code to the pico cell system 11 (step S15).

Upon receipt of this second code, the server 40 in the pico cell system 11 will check the validity of the second input code with respect to criteria relating to valid PIN codes (step S16). As discussed earlier, this validity check may be a simple format check. In the example, however, where the assigned PIN codes for the passengers on the flight have been uploaded to the pico cell system 11 (back at step S4), then the validity check at S16 may entail a comparison of the received second input code to the stored PIN codes that were assigned to the passengers on the particular flight. If the BSC 31 of the pico cell system 11 has sufficiently identified the mobile station 17 from the signaling communications, e.g. to determine its mobile telephone number, the validity check might also determine whether the particular PIN matches a code assigned to the particular passenger's mobile station 17, if the airline accumulated the mobile station identification data at check-in.

If the second input code is not valid, in accord with the criteria being applied by the server 40 of the pico cell system 11, then processing branches from step S16 to step S17. In the example, the pico cell system will allow some small number of attempts to enter a valid PIN code. The example permits three (3) tries before service denial, although a smaller or larger number of attempts may be permitted. Step S17 therefore involves a check of the number of times that the particular mobile station 17 has attempted PIN code entry. When there has not yet been three attempts at PIN code entry, processing at step S17 branches back to step S14 to again prompt the user for PIN code input. However, if this is a third try by this mobile station 17 on this flight, then processing will branch from step S17 to step S18 in which the pico cell system denies the mobile station wireless communication service through the pico cell system in the aircraft, i.e. because the second input code has failed to satisfy the validity criteria. The denial of service will cause the pico cell system to ignore further communications for the particular mobile station 17 during the flight. At the time of denial of service, the pico cell system may send a message (not shown) to the mobile station 17 to inform the passenger.

Returning to step S16, assume now that the received second input code is valid, in accord with the criteria being applied by the server 40 of the pico cell system 11. Processing therefore branches at step S16 to step S19. At this point in the process flow example, the first input code has matched the security access code, and the second input code has been validated against the applicable PIN code criteria. Hence, the pico cell system 11 will provide the mobile station with the desired wireless communication service. Step S19 generally represents further processing as may be required to enable the desired communication of the passenger using the mobile station 17, including communications through the pico cell system 11, the air to ground link and the MSC 59 in the example of FIG. 1. Typically, the pico cell system will record the entered PIN code, e.g. in association with any usage records for calls or sessions involving the mobile station 17, for further processing if desired for billing and/or security analysis.

As shown by the above discussion, many of the functions relating to the security features of the pico cell system 11 may be implemented on computers or other programmable devices used to implement or connected for control of the various elements of the system on-board the airplane 13. The security application 65 may run on any appropriate platform. The software functionalities involve programming, including executable code as well as associated stored data, for causing the various hardware platforms implementing the security functions regarding security code assignment (SAC and/or PIN) and validation of user code inputs, as exemplified by discussion herein. In operation, the executable code and possibly the associated data records are stored within the respective hardware platform. At other times, however, the software may be stored at other locations and/or transported for loading into the BSC or other appropriate platform on board the aircraft or into the computer on the ground. Hence, the embodiments involve one or more software products in the form of one or more modules of executable code carried by at least one machine-readable. Execution of such code by a processor or the like of the platform enables the programmed device to perform the code assignment and validation functions for the pico cell system, in essentially the manner performed in the system and network elements discussed and illustrated herein.

As used herein, terms such as computer or machine "readable medium" refer to any medium that participates in providing instructions to a processor for execution. Such a medium may take many forms, including but not limited to, non-volatile storage media and volatile storage media. Non-volatile storage media include, for example, optical or magnetic disks, such as storage devices in any BSC or computer (s) operating as the controller of the pico cell system. Volatile storage media include dynamic memory, such as main memory of a BSC or other computer platform. Many of these forms of computer readable media may be involved in carrying one or more sequences of one or more instructions to a processor for storage and/or execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List
The description above has used a large number of acronyms to refer to various services, messages and system components. Although generally known, use of several of these acronyms is not strictly standardized in the art. For the convenience of the reader, the following list correlates terms to acronyms, as used in the detailed description above.

3rd Generation Partnership Project 2 (3GPP2)
Advanced Mobile Phone Service (AMPS)
Authentication, Authorization and Accounting (AAA)
Base Station (BS)
Base Station Controller (BSC)
Base Transceiver System (BTS)
Code Division Multiple Access (CDMA)
Department of Homeland Security (DHS)
Department of Justice (DOJ)
Equivalent Isotropic Radiated Power (EIRP)
Evolution Data Optimized (EVDO)
Federal Bureau of Investigations (FBI)
Federal Communications Commission (FCC)
General Packet Radio Service (GPRS)
Global Positioning System (GPS)
Global System for Mobile (GSM)
Home Location Register (HLR)
Infrared (IR)
Mobile Station (MS)
Mobile Switching Center (MSC)
Mobile Telephone Switching Office (MTSO)
Packet Data Serving Node (PDSN)
Passenger Name Record (PNR)
Personal Communication Service (PCS)
Personal Computer (PC)
Personal Digital Assistant (PDA)
Preferred Roaming Lists (PRL)
Public Land Mobile Network (PLMN)
Public Switched Telephone Network (PSTN)
Radio Access Network (RAN)
Radio Frequency (RF)
Time Division Multiple Access (TDMA)
Universal Mobile Telecommunications System (UMTS)
Visited Location Register (VLR)

What is claimed is:

1. A method of operating a pico cell system in a vehicle capable of providing wireless communications for a mobile station of a user riding in the vehicle, comprising:
    assigning a security access code to correspond to a scheduled travel segment of the vehicle,
    wherein: said security access code is a code required to be input by the user of the mobile station for validation before communication will be permitted, and the security access code assigned to correspond to the scheduled travel segment of the vehicle is valid only for the scheduled travel segment;
    only after travel of the vehicle over the segment commences, providing the security access code assigned to correspond to the scheduled travel segment of the vehicle, to one or more people riding in the vehicle, including the user of the mobile station;

receiving an input code from the mobile station in the pico cell system during the travel of the vehicle over the segment;

comparing the received input code to the security access code;

denying the mobile station wireless communication service through the pico cell system in the vehicle, if the comparison fails to produce a match of the received input code to the security access code assigned to correspond to the scheduled travel segment of the vehicle;

assigning a personal identification number (PIN) code for the user of the mobile station; correlating the PIN code to the user and to a seat assignment within the vehicle for the user of the mobile station;

issuing the PIN code to the user of the mobile station;

receiving another input code from the mobile station in the pico cell system during the travel of the vehicle over the segment; and checking validity of the other received input code as a PIN code;

wherein:

the vehicle is an aircraft;

the one segment is a flight of the aircraft; and the providing of the security access code to the user occurs after the aircraft reaches a predetermined altitude during the flight.

2. The method as in claim 1, further comprising permitting a mobile station to utilize wireless communication service through the pico cell system in the vehicle for communications extending outside the vehicle, upon receipt of an input code that matches the security access code.

3. The method of claim 1, wherein the checking comprises determining if the other received input code has a format corresponding to a valid format for the PIN code.

4. The method of claim 1, wherein the checking comprises:
comparing the other received input code to the PIN code; and
denying the mobile station wireless communication service through the pico cell system in the vehicle, if comparison indicates that the other received input code does not match the PIN code.

5. The method as in claim 4, further comprising permitting the mobile station to utilize wireless communication service through the pico cell system in the vehicle for communications extending outside the vehicle only when the received input codes respectively match the security access code and the PIN code.

6. The method of claim 4, wherein the PIN code is issued to the user of the mobile station at or after baggage check-in for the segment of travel of the vehicle.

7. The method of claim 1, further comprising:
invalidating the security access code assigned to correspond to the scheduled travel segment of the vehicle, after the vehicle completes the travel segment; and
assigning a different security access code to correspond to a subsequent travel segment of the vehicle.

8. A method of operating a pico cell system in an aircraft to provide wireless communications to and from the aircraft, comprising:
assigning a security access code to correspond to a scheduled flight of the aircraft, wherein: said security access code is a code required to be input by a user of a mobile station for validation before communication will be permitted, and the security access code assigned to correspond to the scheduled flight of the aircraft is valid only for the scheduled flight;

assigning a personal identification number (PIN) code for a user of one mobile station for travel on the scheduled flight;

correlating the PIN code to the user and to a seat assignment within the aircraft for the user of the one mobile station;

issuing the PIN code to the user of the one mobile station at or after the user checks-in for the scheduled flight;

only after the scheduled flight of the aircraft commences, providing the security access code assigned to correspond to the scheduled flight of the aircraft to one or more people in the aircraft, including the user of the one mobile station;

receiving first and second input codes from one or more mobile stations in the pico cell system during the scheduled flight of the aircraft;

comparing each received first input code to the security access code assigned to correspond to the scheduled flight of the aircraft;

checking validity of each received second input code with respect to a criteria relating to the PIN code;

denying a mobile station wireless communication service through the pico cell system in the aircraft from which the received first input code does not match the security access code assigned to correspond to the scheduled flight of the aircraft;

denying a mobile station wireless communication service through the pico cell system in the aircraft from which the received second input code fails the validity check; and providing a mobile station wireless communication service through the pico cell system in the aircraft from which the received first input code matches the security access code assigned to correspond to the scheduled flight of the aircraft and the received second input code passes the validity check;

wherein the security access code is provided to the one or more people in the aircraft only after the aircraft reaches a predetermined altitude during the scheduled flight.

9. The method as in claim 8, further comprising:
invalidating the security access code assigned to correspond to the scheduled flight of the aircraft after the aircraft completes the scheduled flight; and
subsequently assigning a different security access code to correspond to a subsequent scheduled flight of the aircraft.

10. A pico cell system for use in a vehicle to provide wireless communications for mobile stations of users riding in the vehicle, comprising:
a base station for wireless communication with the mobile stations within the vehicle;
a base station controller for controlling wireless operations of the base station;
a communication interface coupled to the base station for providing two-way communications to and from a public communication network; and
a security server for controlling mobile station access to communications through the interface to and from the public communication network, wherein:
(a) a security access code is assigned to correspond to a scheduled travel segment of the vehicle, as a code required to be input by a user of a mobile station for validation before communication;
(b) the security server is configured to receive first input codes from the mobile stations within the vehicle via the base station during the scheduled travel segment of the vehicle and to deny each respective mobile station access to communications through the interface to and from the public communication network if the respective mobile station has not provided a first input code that matches the security access code assigned to correspond to the scheduled travel segment of the vehicle;

(c) the security access code is valid only for the scheduled travel segment, and is given to users of the mobile stations within the vehicle only after the vehicle begins travel of the scheduled segment;

(d) a personal identification number (PIN) code is assigned for the user of the mobile station, the PIN code is correlated to the user and to a seat assignment within the vehicle for the user of the mobile station, and the PIN code is issued to the user of the mobile station; and (e) the security server is configured to receive second input codes from the mobile stations within the vehicle via the base station during the scheduled travel segment of the vehicle and to check validity of the received second input code as a PIN code;

wherein:

the pico cell system is for use in an aircraft; and the security server is configured to output the security access code after the aircraft reaches a predetermined altitude in flight on the scheduled travel segment.

11. The pico cell system of claim 10, wherein the security server is further configured to permit one of the mobile stations to access communications through the interface to and from the public communication network if the one mobile station has provided a first input code that matches the security access code.

12. The pico cell system of claim 10, wherein the security server is further configured to deny each respective mobile station access to communications through the interface to and from the public communication network if the respective mobile station has not also provided a second input code satisfying a validation criteria in the validity check for the PIN code.

13. The pico cell system of claim 12, wherein the security server is further configured to permit one of the mobile stations to access communications through the interface to and from the public communication network if the one mobile station has both:

provided a first input code that matches the security access code; and provided a second input code satisfying the PIN code validation criteria.

14. The pico cell system of claim 13, wherein the pico cell system is configured to compile a usage record in association with the second input code, for each permitted communication of the one mobile station.

15. The pico cell system of claim 14, wherein the security server is further configured to deliver/output usage records to a security agency.

16. The pico cell system of claim 10, wherein the security server is further configured to output the security access code after the vehicle begins travel of the scheduled segment in a manner to enable distribution of the security access code to users of the mobile stations within the vehicle.

17. A program product comprising: a tangible machine readable medium;

and executable code embodied on the medium, wherein execution of the code by a programmable security controller of a pico cell system operating in an aircraft will cause the security controller to control operations of the pico cell system to provide wireless communications for mobile stations within the aircraft, the controlled operations including steps comprising:

(a) issuing to mobile station users in the aircraft a security access code assigned to correspond to a scheduled flight of the aircraft, only after the aircraft begins the scheduled flight, wherein said security access code is a code required to be input by a user of a mobile station for validation before communication will be permitted, and the security access code remains valid only during the scheduled flight;

(b) denying each respective mobile station access to communications between the pico cell system and a public communication network, if the respective mobile station has not provided an input code that matches the security access code assigned to correspond to the scheduled flight of the aircraft;

(c) assigning a personal identification number (PIN) code for the user of the mobile station, wherein the PIN code is correlated to the user and to a seat assignment within the aircraft for the user of the mobile station and the PIN code is issued to the user of the mobile station; and (d) receiving another input code from the respective mobile station in the pico cell system during the scheduled flight of the aircraft; and (e) checking validity of the other received input code as a PIN code;

wherein the security access code is provided to the one or more mobile station users in the aircraft only after the aircraft reaches a predetermined altitude during the scheduled flight.

18. The product of claim 17, wherein the controlled operations steps further comprise permitting one of the mobile stations to access communications between the pico cell system and the public communication network if the one mobile station has provided an input code that matches the security access code.

19. The product of claim 17, wherein the controlled operations steps further comprise denying each respective mobile station access to communications between the pico cell system and from a public communication network if the respective mobile station has not also provided an input code satisfying a validation criteria in the validity check for the PIN code.

20. The product of claim 19, wherein the controlled operations steps further comprise permitting one of the mobile stations to access communications between the pico cell system and the public communication network if the one mobile station has provided both a first input code that matches the security access code and a second input code that satisfies the PIN code validation criteria.

21. The product of claim 20, wherein the controlled operations steps further comprise compiling a usage record in association with the second input code, for each permitted communication of the one mobile station.

22. The product of claim 21, wherein the controlled operations steps further comprise transferring one or more usage records for permitted communication of the one mobile station to a security agency.

23. The method of claim 1, wherein the PIN code includes an identification of the user of the mobile station and the seat assignment within the vehicle for the user of the mobile station.

24. The method of claim 8, wherein the PIN code includes an identification of the user of the one mobile station and the seat assignment within the aircraft for the user of the one mobile station.

25. The pico cell system of claim 10, wherein the PIN code includes an identification of the user of the mobile station and the seat assignment within the vehicle for the user of the mobile station.

26. The product of claim 17, wherein the PIN code includes an identification of the user of the mobile station and the seat assignment within the aircraft for the user of the mobile station.

27. The method of claim 1, further comprising uploading the PIN code to the pico cell system after the user of the mobile station checks-in for the scheduled travel and prior to commencement of travel of the vehicle over the segment.

28. The method of claim 8, further comprising uploading the PIN code to the pico cell system after the user of the one mobile station checks in for the scheduled flight and prior to commencement of the scheduled flight of the aircraft.

29. The pico cell system of claim 10, wherein the PIN code is uploaded to the pico cell system after the user of the mobile station checks-in for the scheduled travel and prior to commencement of travel of the vehicle over the segment.

30. The product of claim 17, wherein the controlled operations steps further comprises uploading the PIN code to the pico cell system after the user of the mobile station checks-in for the scheduled travel and prior to commencement of travel of the vehicle over the segment.

* * * * *